United States Patent
Merken-Schiller et al.

(10) Patent No.: US 7,516,598 B2
(45) Date of Patent: Apr. 14, 2009

(54) METHOD AND DEVICE FOR PERMANENTLY DEFORMING A FLEXIBLE FILM MATERIAL

(75) Inventors: Richard Merken-Schiller, Dusseldorf (DE); Stefan Eberhardt, Aachen (DE); Pamela Czechowski, Mönchengladbach (DE)

(73) Assignee: Mars Incorporated, McClean, VA (US)

( * ) Notice: Subject to any disclaimer, the term of this patent is extended or adjusted under 35 U.S.C. 154(b) by 2 days.

(21) Appl. No.: 10/540,591

(22) PCT Filed: Jan. 16, 2004

(86) PCT No.: PCT/EP2004/000275

§ 371 (c)(1),
(2), (4) Date: Jan. 20, 2006

(87) PCT Pub. No.: WO2004/065216

PCT Pub. Date: Aug. 5, 2004

(65) Prior Publication Data

US 2006/0202396 A1   Sep. 14, 2006

(30) Foreign Application Priority Data

Jan. 21, 2003  (DE) .................. 103 02 091

(51) Int. Cl.
*B65B 47/02* (2006.01)
*B29C 51/00* (2006.01)

(52) U.S. Cl. .................... 53/453; 53/561; 264/239

(58) Field of Classification Search .......... 53/453, 53/559, 561, 558, 574, 591, 440, 127; 156/299, 156/300; 264/267, 271.1, 294, 272.5, 272.17, 264/510, 511, 153, 163, 272.15, 239
See application file for complete search history.

(56) References Cited

U.S. PATENT DOCUMENTS

| 3,237,242 | A | * | 3/1966 | Gerletz ....................... 425/214 |
| 3,358,419 | A | * | 12/1967 | Bjork et al. .................. 53/546 |
| 3,654,012 | A | * | 4/1972 | Schlager ..................... 156/212 |
| 3,762,125 | A | * | 10/1973 | Prena ............................ 53/51 |
| 3,920,371 | A | * | 11/1975 | Faller ......................... 425/388 |
| 4,114,213 | A | | 9/1978 | Beernaerts et al. |
| 4,124,421 | A | * | 11/1978 | Fujii ........................... 156/87 |
| 4,223,512 | A | * | 9/1980 | Buchner ....................... 53/425 |
| 4,246,223 | A | * | 1/1981 | Patterson ..................... 264/292 |
| 4,671,835 | A | * | 6/1987 | Gagnon ....................... 156/160 |
| 4,704,183 | A | * | 11/1987 | Sigerist ....................... 156/475 |
| 4,920,731 | A | * | 5/1990 | Rimondi et al. ................ 53/556 |
| 4,958,480 | A | * | 9/1990 | Warner ....................... 53/433 |
| 5,009,056 | A | * | 4/1991 | Porteous ...................... 53/412 |
| 5,187,921 | A | * | 2/1993 | Wilson et al. ................. 53/453 |
| 5,193,265 | A | * | 3/1993 | Muggli et al. .............. 29/527.4 |
| 5,718,791 | A | | 2/1998 | Spengler et al. |
| 5,948,490 | A | * | 9/1999 | Raines et al. .............. 428/35.2 |
| 2002/0079611 | A1 | * | 6/2002 | Ellison et al. ............... 264/247 |
| 2002/0160214 | A1 | * | 10/2002 | Hirosue et al. ............ 428/473.5 |

* cited by examiner

*Primary Examiner*—Paul R Durand
(74) *Attorney, Agent, or Firm*—Fulbright & Jaworski, LLP

(57) ABSTRACT

A method for permanently deforming a flexible film material, in which the film material is deformed, forming a receptacle depression, the film material being kept under controlled tension while it is being moulded, so that controlled creases are formed in the film material, and a method of manufacturing a product packed in flexible film material, especially a food product, using the method and device for permanently deforming a flexible film material.

24 Claims, 2 Drawing Sheets

METHOD AND DEVICE FOR PERMANENTLY DEFORMING A FLEXIBLE FILM MATERIAL

CROSS-REFERENCE TO RELATED APPLICATIONS

This application is national stage filing of PCT/EP2004/000275 filed Jan. 16, 2004, claiming priority to DE 103 02 091.8 filed Jan. 21, 2003.

TECHNICAL FIELD

The invention relates to a method and a device for permanently deforming a flexible film material, and a method of manufacturing a product packed in a flexible film material, especially a food product, using the method of the invention.

BACKGROUND OF THE INVENTION

Known three-dimensional moulded packages are produced from relatively thick film material using the thermal moulding process. Packages produced in this way are relatively stiff and inflexible.

The object of the invention consists in providing a method and a device with which flexible film material can be moulded in such a way that the depressions formed are less stiff and have a more pleasant feel than is the case with the conventional thermal moulding processes.

In terms of the process, this object is achieved by a method for permanently deforming a flexible film material, in which the film material is moulded, forming a depression as a receptacle, the method being characterised by the fact that the film material is kept under controlled tension while it is being moulded, so that controlled creases are formed in the film material.

BRIEF SUMMARY OF THE INVENTION

In the process, it may be provided for the tension to be relaxed or released in a controlled manner during the deforming procedure.

In one variant of the invention, the tension can be controlled by applying a controlled retaining force to peripheral regions of the film material.

In a different variant, the tension can be controlled by moving edge portions of the film material towards one another in a controlled manner. In this connection, it can be provided for the edge portions to be moved a specific distance towards one another. The edge portions can be moved parallel to one another or towards one another in radial directions.

The invention conveniently provides for the tension to be controlled in such a manner that, in the region of the receptacle depression, a substantially crease-free region and a region provided with controlled creases are formed.

Preferably, it is provided that the film material is brought to a controlled temperature before or during the deforming process which makes permanent deformation of the film material possible.

It can be provided for the temperature to be raised or lowered during the deforming process.

It is conveniently provided for the film material to be partially or completely printed before the deforming process. In this connection, it can be provided that the film material is printed with distortion-sensitive contents, such as writing, logos or trade marks in a region which is only slightly distorted during the deforming process. In other words, the printing is arranged as far as possible such that writing or pictorial contents of the printed image which are particularly sensitive to distortion, i.e. those which would suffer considerably from distortion and therefore ought to appear as undistorted as possible on the deformed film material, are very largely arranged within a region which is only slightly distorted during the deforming process. This gives rise to the possibility that the film material is printed with an undistorted printed image. This has the advantage that distortions, which otherwise occur during the deforming process, do not have to be compensated for in advance, as is the case with the packages of the prior art.

The invention preferably provides for the film material to be deformed with a positive and/or a negative mould. The positive and/or the negative mould is preferably unheated, though it can also be provided that the positive and/or the negative mould are heated and brought to a predeterminable temperature. In addition, it can be provided for the positive and/or the negative mould to be subjected to a partial vacuum.

In a preferred embodiment of the method, it is provided that the film material is heated and deformed during a deformation time between a positive and a negative mould, the tension in the film material being relieved in a controlled manner during the deformation time and/or after a recovery time after the end of the deformation time.

The recovery time can be up to several seconds long.

In a further development of the invention, it can be provided that the flexible film material is delivered to a deforming station in cycles, such that a number of receptacle depressions are formed simultaneously with each stroke of the cycle, with margins of the web being kept under controlled tension. The flexible film material can in this connection be delivered either in the form of a continuous web or in the form of individual blanks.

The invention further provides a method of manufacturing a product packed in flexible film material, especially a food product, using the method of the invention for permanently deforming the flexible film material, which is characterised by the fact that a product to be packed, especially a food product, is placed in the receptacle depression. In a further development of the method, it can be provided that the product is introduced into the receptacle depression in a free-flowing state. The receptacle depression can be sealed, especially with a sealing film. In this connection, a peripheral sealing rim or seam can be formed, e.g. by bonding or ultrasonic welding.

With regard to the device, the object of the invention is achieved by a device for permanently deforming a flexible film material which is particularly suitable for carrying out the method of the invention, with a positive and/or a negative mould and a means for holding edge portions of the film material in a controlled manner.

It is preferably provided that the positive and/or negative mould can be connected to a vacuum source.

The device is appropriately characterised by a heating means for heating the film material to a controlled temperature.

BRIEF DESCRIPTION OF THE DRAWINGS

The invention will now be described by means of a working embodiment, reference being made to a drawing in which.

DETAILED DESCRIPTION OF THE INVENTION

Figure 1:
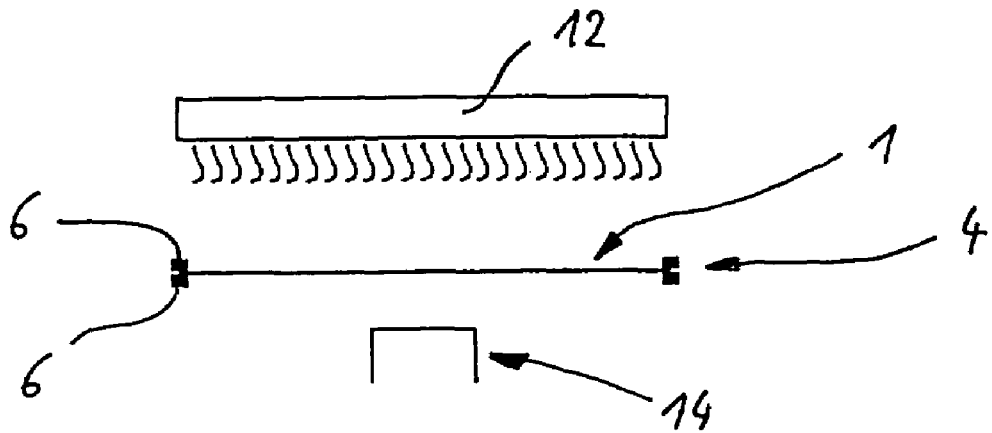
FIG. 1 shows a schematic view of an arrangement of heating means, film material and a negative mould in an initial position.
Figure 2:
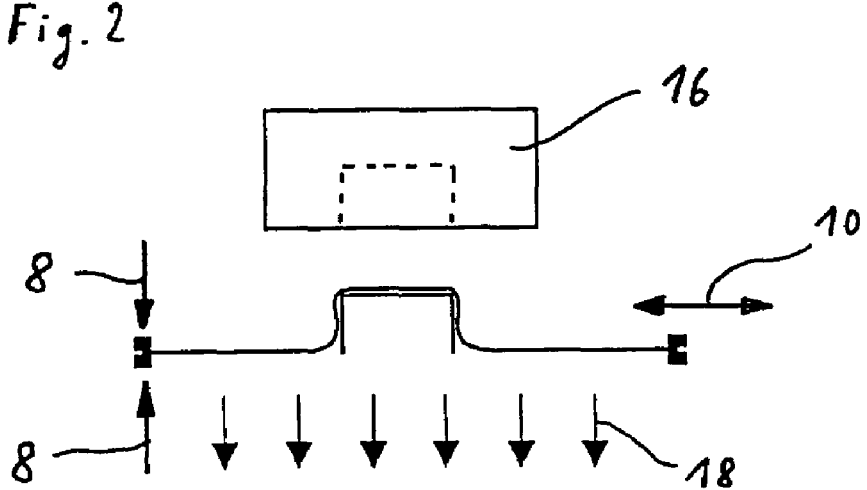
FIG. 2 shows the arrangement of FIG. 1, including a negative mould, in a first moulding position.
Figure 3:
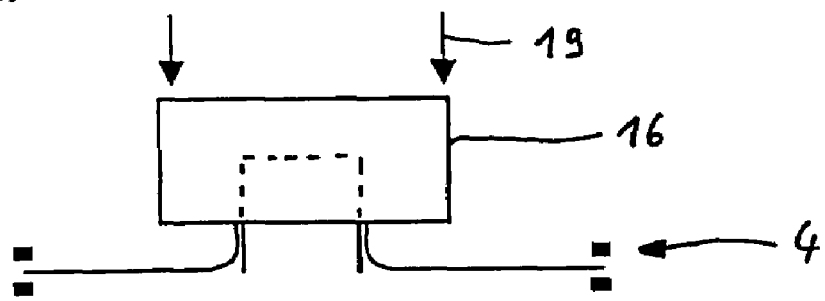
FIG. 3 shows the arrangement of FIG. 2 in a second moulding position.
Figure 4:
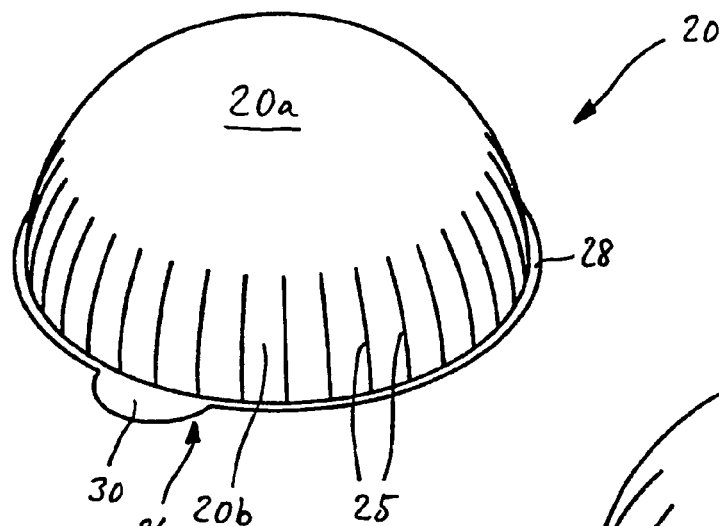
FIGS. 4 to 7 show different film packages which are produced together in accordance with the arrangement of the invention according to FIGS. 1 to 3.
Figure 5:
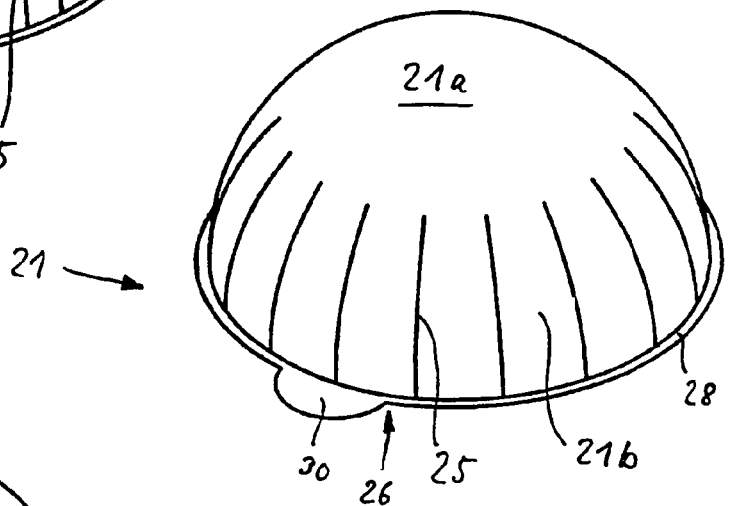
Figure 6:
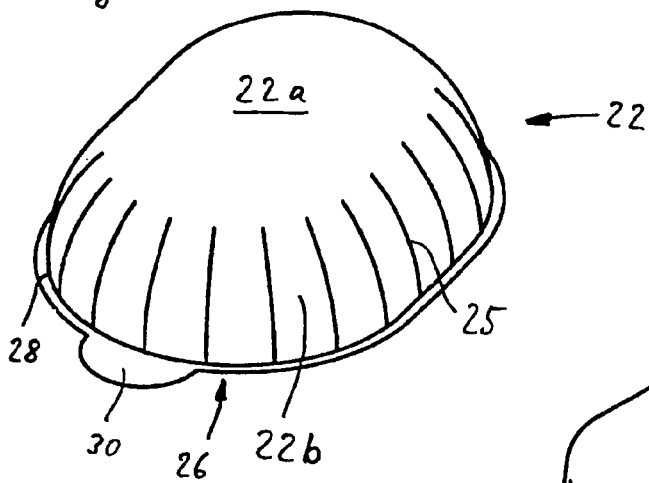
Figure 7:
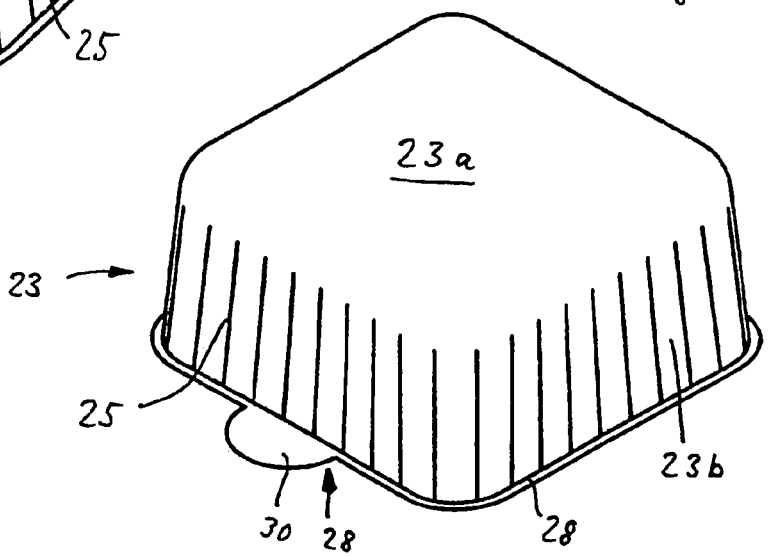

FIGS. 1 to 3 illustrate the basic principle of the invention. First of all, a flexible foil or film material 1 suitable for permanent deforming is prepared. Unlike PVC, PET, PS or PP materials with a thickness of about 100 μm to 500 μm, with which relatively stiff and inflexible packages are obtained in the thermal moulding process, the approach of the invention makes it possible to deform thinner standard packaging materials with a thickness of about 30 to 60 μm, thicknesses of up to 100 μm or more, though as a rule not more than 150 μm, still being advantageously usable. Appropriate materials can be PE, OPP, PLA, PP/Al, G-PET, metallised OPP or varnished PP/PE. Even materials with a thickness of less than 30 μm can be processed successfully, e.g. PLA with a material thickness of only 20 μm.

A positive (convex) and a negative (concave) mould 14, 16 serve to shape the material. It goes without saying that any desired number, arrangement, shape and size of the moulds is possible.

As FIG. 1 shows schematically, the film material 1 is clamped at the margins with a holding device 4. The holding device 4 has for example, two straight or contoured clamping elements 6, which exert a clamping force on the edge portions of the film material 1 pointing in the direction of the arrows 8. The clamping elements 6 can be moved in a controlled manner in an adjustment direction 10, in order to apply controlled tension to the film material 1. Alternatively to the mobility of the clamping elements 6 in the adjustment direction 10, it might be provided for the clamping force 8 of clamping element 6 to be altered in a controlled manner, so that, when a predetermined tension is reached or exceeded, the film material begins to slide through the clamping elements 6, as a result of which controlled tension can be generated in the film material.

Alternatively, there could be provision for using, within the clamping elements 6, a drive effective on the film material in the adjustment direction 10, e.g. via friction rolls, by means of which a controlled film movement or film tension can be achieved.

Sensors (not shown) in the region of the clamping elements 6 detect the tension in the film material 1, it being possible to provide an appropriate number of sensors, depending on the number of clamping elements, friction rolls or the like, in order to detect a desired spatial resolution of the distribution of tension.

Although only two mutually opposing holding means are shown in the drawing, a plurality of holding means can be disposed along the periphery of the film material, e.g. along a polygonal or round contour, if the film material is not delivered and processed in web form.

At a predetermined distance from the film material 1, which can be changed as required, there is a heating means 12, the object of which is to bring the temperature of the film material 1 to a desired level, which can be changed over time if necessary. It is convenient, before the beginning of a deforming process (FIGS. 2 and 3), for the film material to be brought to a temperature that permits plastic deformation, i.e. appropriately in the softening range of the material used. In the case of a PP/PE-laminated material, good results can be obtained when working at temperatures of between about 220° C. and about 300° C.

As an alternative or in addition to the heating means 12, it can be provided that the film material is only or additionally heated upon contact with a mould, it being possible, for example, to make the positive mould 14 and/or the negative mould 16 heatable.

As indicated by 18 in FIG. 2, a vacuum source (not shown) can be connected to one of the moulds, in this case the positive mould 14, in order to ensure that the film material 1 is in intimate contact with the positive mould 14 in a first deformation step.

Unlike the conventional thermal moulding process, the film is not kept under uncontrolled tension (i.e. one that changes at random during the deforming process), with the negative mould 16 being moved against the positive mould 14 (arrows 19), but the tension is controlled during and/or after the moulding process carried out with the moulds (deformation time while the positive and negative moulds are moving together). In the example depicted, the tension is relaxed or released in a controlled manner, as a result of which part of the film material can be removed smoothly from the mould, and edge portions with controlled creases are formed. The ratio of smoothly formed surface to the surface with defined creases is thus easier to control. In FIG. 3, it is indicated that the material is thermally deformed and that the tension of the material is reduced in the deformed state, so that additional material can penetrate between the positive and negative moulds in order to form creases in the edge portion of the mould shown in FIG. 2 or 3 below. Thanks to the continued flow of material, a central portion of the material, which is located in an upper portion of the moulds in FIGS. 2, 3, is stretched (distorted) relatively little and largely retains its original shape.

The temperature of the film material can be maintained at a desired level by means of heated moulds, and the time at which the tension of the material is reduced can be selected relative to the time at which the moulds move together or close, in order to obtain a desired crease characteristic. Alternatively, it is possible to work with cold moulds.

FIGS. 4 to 7 explain by way of example some possible receptacle depressions 20 to 23, which are produced according to the method of the invention. The receptacle depressions each have a central, crease-free portion 20a to 23a, which has only been deformed or distorted relatively little, because of the controlled relaxation of the tension of the film material during production, and a lateral creased portion 20b to 23b, in which the film material 1 has settled into controlled creases 25. A particular advantage here is the relatively slight deformation or distortion in the central portion 20a to 23a, which makes it possible to print the film material without distortion beforehand, without any creases forming and/or any unsatisfactory or excessive distortion of the printed image occurring after the deforming process. In contrast to this, it used to be necessary to print in a distorted way in the prior art (thermal moulding process), in order to compensate for the distortion that occurred.

The receptacle depressions are tightly sealed with a sealing film 26, to form a sealed individual package, which is sealed along a peripheral sealing rim 28 with the film material of the receptacle depressions. A gripping tab 30 facilitates the removal of the sealing film 26 to open the package.

In order to achieve the desired crease depth, number of creases and crease length (ratio of smooth to creased surface), numerous process parameters can be varied, e.g. material and thickness of the starting film, temperature of the film before the moulds are closed, temperature of the positive mould, temperature of the negative mould, strength of the vacuum, time at which the tension of the film material is relaxed, way in which the tension is relaxed (moving the edges a specific distance and/or at a specific speed or for a specific time, releasing the edges, maintaining a specific tension) etc.

In an advantageous manner, a product, especially a food product, e.g. confectionary, ready-formed or even as a liquid or free-flowing mass, can be introduced into the receptacle depression and given its final shape by the pre-finished film deformation as it cools down, solidifies, hardens or the like.

A receptacle depression can be an individual package e.g. for a chocolate-type product. Alternatively, a receptacle depression can be part of a package, e.g. part of a film pouch, and a receptacle depression in accordance with the invention can be formed in a side surface of a pouch.

What is claimed is:

1. A method of manufacturing a product packed in flexible film material, especially a food product, comprising the steps of:
    providing a positive and negative mould;
    placing a film material between the positive and negative moulds, the film material having edge portions;
    forming a single receptacle depression in the film material between the moulds;
    providing tension on the film material in order to stretch it without forming creases in a central portion of the depression;
    reducing the tension of the film material while it is being moulded in order to draw additional film material between the positive and negative moulds in which lateral creases are formed in the film material around the entire edge portion of the film material while the film material in the central upper portion of the mould retains its original shape during the deforming procedure; and
    placing a product to be packed in the receptacle depression.

2. The method as claimed in claim 1, wherein the food product is introduced into the receptacle depression in a free-flowing state.

3. The method as claimed in claim 1, wherein the edge portion of the film material of the receptacle is sealed with a sealing film.

4. The method as claimed in claim 3, wherein a peripheral sealing rim or seam is formed by bonding or ultrasonic welding.

5. The method of claim 1, wherein the product to be packed is a food product.

6. A method for permanently deforming a flexible film material, in which the film material is deformed, comprising the step of:
    providing a positive and negative mould;
    placing a film material between the positive and negative moulds, the film material having edge portions;
    forming a single receptacle depression in the film material between the moulds;
    providing tension on the film material in order to stretch it without forming creases in a central portion of the depression;
    reducing the tension of the film material while it is being moulded in order to draw additional film material between the positive and negative moulds in which lateral creases are formed in the film material around the entire edge portion of the film material while the film material in the central upper portion of the mould retains its original shape during the deforming procedure.

7. The method as claimed in claim 6, wherein the tension is controlled by applying a controlled retaining force to peripheral regions of the film material.

8. The method as claimed claim 6, wherein the tension is controlled by moving peripheral regions of the film material towards one another in a controlled manner.

9. The method as claimed in claim 8, wherein the peripheral regions are moved a specific distance towards one another.

10. The method as claimed in claim 8, wherein the peripheral regions are moved parallel to one another or towards one another in radial directions.

11. The method as claimed in claim 6, wherein the tension is controlled in such a manner that, in the region of the receptacle depression, a substantially crease-free central region is formed and a region along the entire edge portion of the film material is formed with controlled lateral creases.

12. The method as claimed in claim 6, wherein the film material is brought to a controlled temperature before or during the deforming process, which makes permanent deformation of the film material possible.

13. The method as claimed in claim 12, wherein the temperature is raised or lowered during the deforming process.

14. The method as claimed in claim 6, wherein the film material is partially or completely printed before the deforming process.

15. The method as claimed in claim 14, wherein the film material is printed with distortion-sensitive contents, such as writing, logos or trade marks in a region which is only slightly distorted during the deforming process.

16. The method as claimed in claim 14, wherein the film material is printed with an undistorted printed image.

17. The method as claimed in claim 6, wherein the positive or the negative mould is unheated.

18. The method as claimed in claim 6, wherein the positive or the negative mould are heated and brought to a predetermined temperature.

19. The method as claimed in claim 6, wherein the positive or the negative mould are subjected to a partial vacuum.

20. The method as claimed in claim 6, wherein the film material is heated and deformed during a deformation time between the positive and a negative mould, the tension in the film material being relieved in a controlled manner during the deformation time or after a recovery time after the end of the deformation time.

21. The method as claimed in claim 20, wherein the recovery time can be up to several seconds long.

22. The method as claimed in claim 6, wherein the flexible film material is delivered to a deforming station in cycles, such that a number of receptacle depressions are formed simultaneously with each stroke of the cycle, with margins of the web being kept under controlled tension.

23. The method as claimed in claim 22, wherein the film material is delivered in the form of a continuous web or in the form of individual blanks.

24. The method of claim 6, wherein the flexible material is less than 150 μM thick.

* * * * *